United States Patent
Briner

[15] 3,645,548
[45] Feb. 29, 1972

[54] SAFETY AUTO SEAT

[72] Inventor: Arthur N. Briner, 17126 Sunderland Drive, Granada Hills, Calif. 91344

[22] Filed: July 28, 1969

[21] Appl. No.: 845,460

[52] U.S. Cl. ...........................................297/216, 297/254
[51] Int. Cl. ..................................B60r 21/10, A47c 1/08
[58] Field of Search..................297/254, 255, 256, 216, 253, 297/250, 457, 325.32, DIG. 2

[56] References Cited

UNITED STATES PATENTS

| | | | |
|---|---|---|---|
| 2,102,979 | 12/1937 | Smith | 297/216 |
| 2,818,909 | 1/1958 | Burnett | 297/216 |
| 2,682,931 | 7/1954 | Young | 297/216 X |
| 2,785,733 | 3/1957 | Witty | 297/457 X |
| 3,111,342 | 11/1963 | De Vos | 297/216 |
| 3,206,247 | 9/1965 | Johnson | 297/457 X |
| 3,393,941 | 7/1968 | Grosfillex | 297/440 |

Primary Examiner—Paul R. Gilliam
Attorney—Herzig and Walsh

[57] ABSTRACT

The device is a safety auto seat particularly for children. It comprises a seat having a back portion and a seat portion mounted on a frame, the frame being configurated to be suspended or hung over the back of an auto seat. The seat itself is attached to the frame to allow relative movement as between the seat and the frame, to allow relative movement as between the seat and the frame, the occupant of the seat being normally held therein by a strap. Sliding connections are provided between the back portion of the seat and the frame and between the seat portion of the seat and the frame so that in the event of a collision (head-on, for example) and high deceleration forces the seat can translate moving forward relative to the frame and thus protecting the occupant from injury from the impact.

3 Claims, 10 Drawing Figures

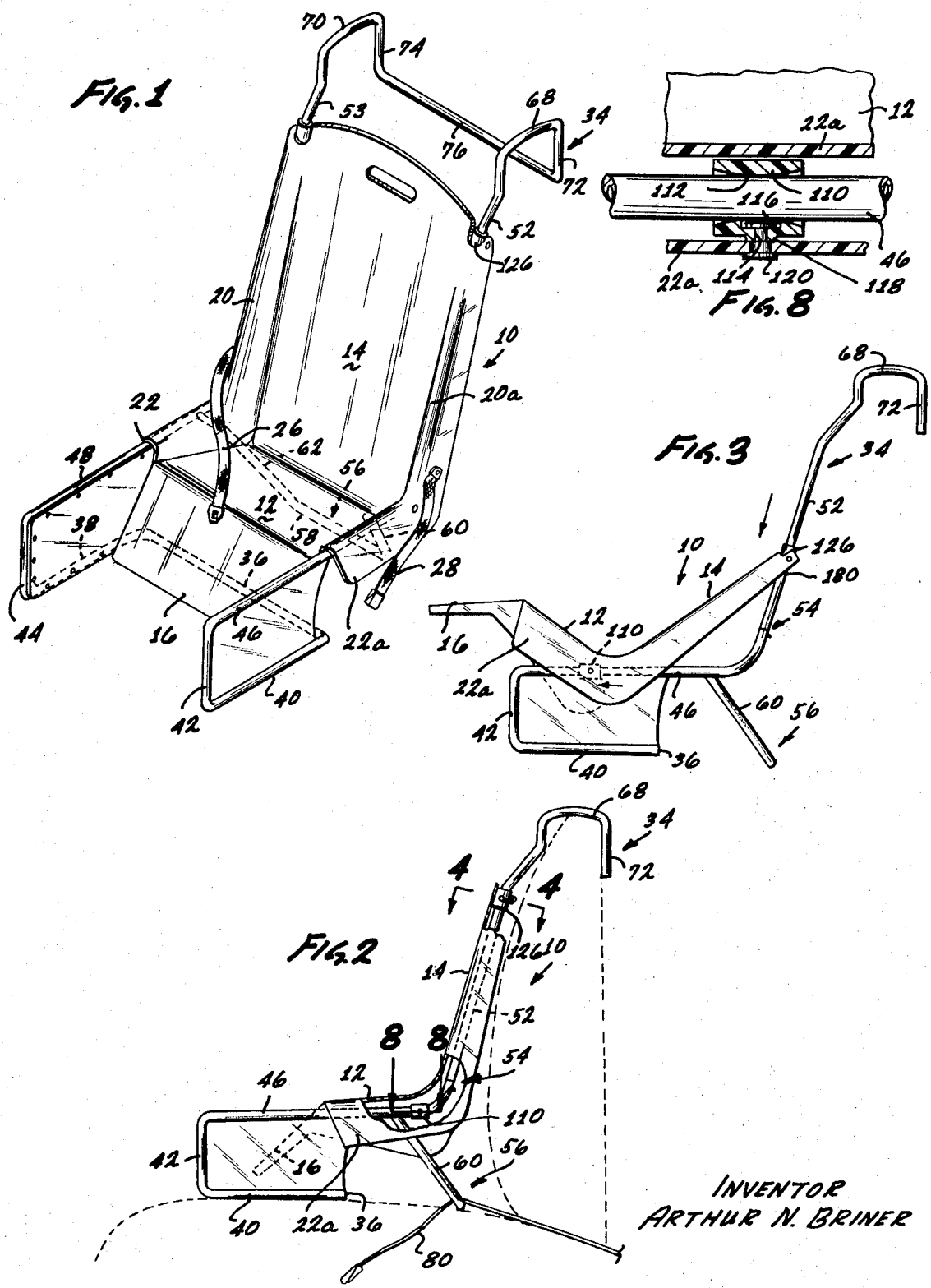

Patented Feb. 29, 1972
3,645,548
2 Sheets-Sheet 2
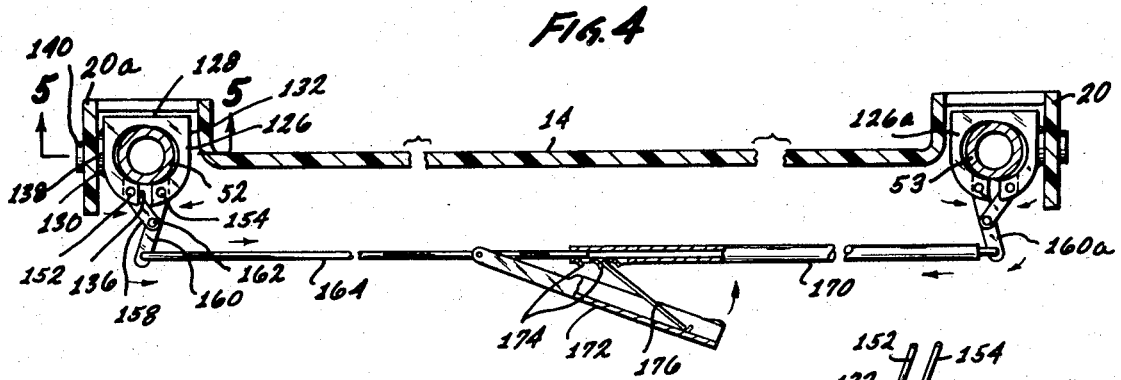
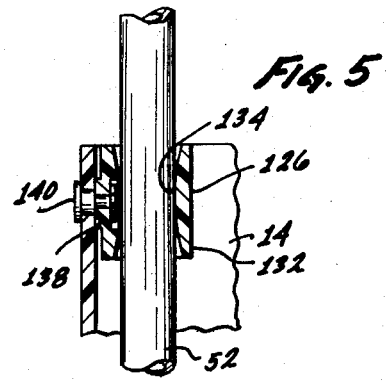
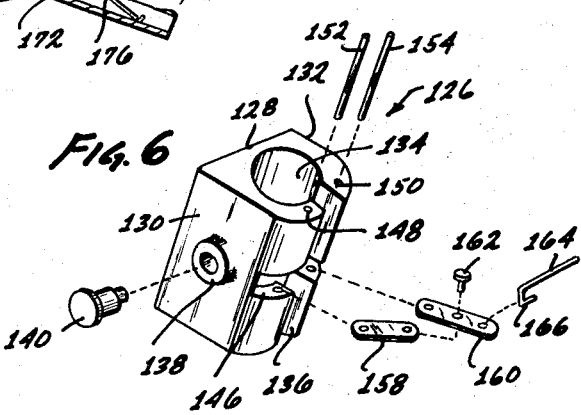
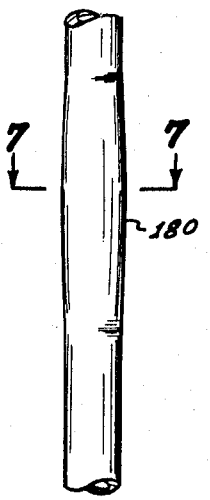
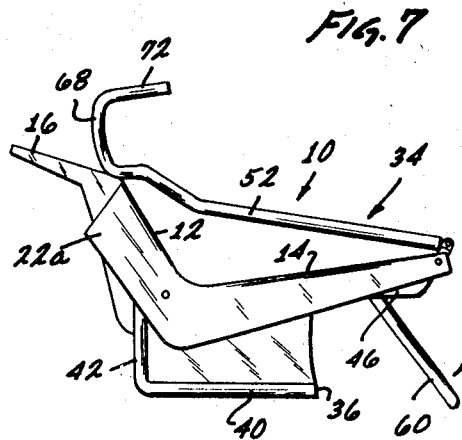
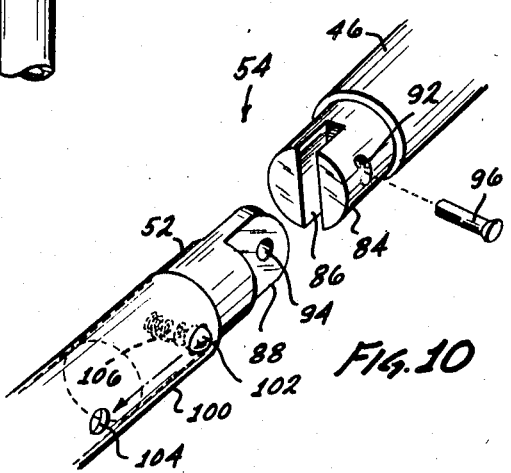
INVENTOR
ARTHUR N. BRINER
BY Herzig & Walsh
ATTORNEYS

SAFETY AUTO SEAT

SUMMARY OF THE INVENTION

The invention is a safety seat for use in vehicles and particularly adapted as a child's safety seat for use in automobiles. An exemplary form of the latter adaption of the invention is described in detail herein as being representative of the invention.

In the exemplary form of the invention there is provided a seat having a back portion and a seat portion which is supported on a frame having means such that it can be suspended from or hung over the back of an automobile seat with a part of the frame resting on the automobile seat. The frame has a substantially horizontal part that rests on the automobile seat and an inclined back part that inclines rearwardly. The seat itself has attachment to the frame allowing relative translating motion between the seat and the frame. In the event of a collision, for example, giving rise to rapid deceleration forces the seat and the occupant thereof who is preferably held in by a seat belt can translate forwardly relative to the frame thereby dissipating the impact forces and protecting the occupant of the seat from injury.

Preferably in the connections between the seat and frame retarding means are provided so that the amount of translating movement of the seat is limited whereby to provide the desired cushioning effect and also the connections are such as to allow the seat to tilt while translating which is beneficial from the standpoint of keeping the occupant in the seat and dissipating the forces.

In the light of the foregoing, the primary object of the invention is to provide a safety seat so constructed that the seat itself can translate relative to a supporting frame to dissipate impact forces.

Another object is to provide a safety seat as in the foregoing comprising a support frame having means to suspend it or hang it over the back of the seat of an automobile with the seat itself connected to the frame to allow translating and tilting movement of the seat relative to the frame.

Another object is to provide a safety seat as in the foregoing having retarding means between the seat and the frame to retard the relative translational movement.

Further objects and additional advantages of the invention will become apparent from the following detailed description and annexed drawings wherein:

FIG. 1 is a perspective view of a preferred form of the invention;

FIG. 2 is a side view of the invention as shown in FIG. 1;

FIG. 3 is a view illustrating forward translational motion of the seat;

FIG. 4 is a sectional view taken along the line 4—4 of FIG. 2;

FIG. 5 is a sectional view taken along the line 5—5 of FIG. 4;

FIG. 6 is a detail view of an attaching clamp;

FIG. 7 is a sectional view taken along the line 7—7 of FIG. 5;

FIG. 8 is a sectional view taken along the line 8—8 of FIG. 2;

FIG. 9 is an illustrative view showing the frame and chair in folded configuration; and FIG. 10 is a detailed view of a joint.

Referring to the various figures of the drawings, FIG. 1 is a perspective view of a preferred form of the invention adapted in a reclining safety auto seat particularly adapted for a child. The seat is designated generally at 10 having a seat portion 12 and a back portion 14 which in the exemplary form of the invention may be constructed by being molded as a single integral unit of suitable material such as, for example, plastic. The seat has a downwardly extending apron 16 at the front and both the back and the seat part have sides joined at the juncture of the seat part 12 and back 14. One of these side parts is designated at 20, the side part being rolled, folded or doubled back as shown at 22 along both the back part 14 and the seat portion 12 of the seat so that the side part forms a groove to receive a part of a tubular support frame as will be described. The side portion on the other side of the seat is designated at 20a with the outwardly rolled part designated at 22a.

Preferably a seatbelt is provided by two straps or belt parts as designated at 26 and 28 suitably attached to the sides of the seat and one of the parts having a buckle on the end for attachment to the other part.

The frame supporting the seat is designated generally at 34 in the exemplary form of the invention described herein. It is of tubular construction employing tubular members made of suitable material such as aluminum or the like. The frame comprises a support part that supports the seat portion of the seat and a back part that is behind and supports the back part of the seat. The support for the seat portion of the seat comprises a tubular member having a part 36 that is normally underneath the front edge of the seat portion 12 it having integral side portions 38 and 40 that normally would rest on the seat of an automobile as may be seen in FIG. 2. These integral tubular members have upright portions as shown at 42 and 44 and then horizontal portions 46 and 48 that extend rearwardly and then upwardly at an angle as may be seen at 52 in FIG. 3. Numeral 54 designates a joint in the side tubular member between the portions 46 and 52 that allows folding of the back part of the frame relative to the seat as will be described presently there being a similar joint in the frame at the other side. Numeral 56 designates a tubular support having a bottom horizontal portion 58 and side portion 60 and 62 the ends of which are secured to the horizontal portions 46 and 48 of the support frame 10. The support member 56 has a position as may be seen in FIGS. 1 and 2 so that it rests on the seat of the automobile forming a part of the support for the seat structure. The tubular members 52 and 53 that form the back part of the supporting frame are extended upwardly as may be seen in FIGS. 1 and 2 having horizontal parts 68 and 70 connected by generally upright portions 72 and 74 to a horizontal part 76 so that a frame structure is provided adapted to be hooked over the top of the back of an automobile seat as may be seen in FIG. 2 so that the frame of the seat structure rests on the seat with the back part of the frame hooked over the back of the seat. The safety belts of passengers sitting adjacent to the safety seat may pass their safety belts through the support frame 56 as may be seen at 80 in FIG. 2, which would resist forward movement of the seat frame in the event of an impact.

FIG. 10 illustrates the joint 54 showing how the back part of the frame can be folded so that the entire structure collapses into a configuration as shown in FIG. 9 so as to be compact occupying a minimum of space for storage or transportation 84 when not in use. The frame member 46 has an extended tubular part 84 of smaller diameter which is bifurcated as shown having a slot 86 which is adapted to receive the tongue 88 on the end of the member 52. The part 84 has a transverse opening 92 and the tongue 88 has an aperture 94 whereby these parts can be pivotally secured together by way of a pivot fastener 96. The end part of the member 52 is of smaller diameter and when the parts 46 and 52 are aligned a sliding sleeve 100 can be moved over the joint to provide for uniform outside diameter along the members the sleeve being held in position by way of a ball detent comprising ball 102, aperture 104 in sleeve 100 and detent spring 106. The slide members that allow for translating and tilting movement of the seat relative to the frame can pass over the joints like the joint 54 as will be described hereinafter.

The seat structure 10 is held to the frame 34 by way of two pairs of slide fittings. The lower pair of these slide fittings is pivotally attached to the sides 22 and 22a of the seat structure and they translate relative to the frame members 46 and 48. The upper pair of slide fittings is attached to the upper of the sides 20 and 20a of the chair 10 as will be described.

FIG. 8 is a sectional view of one of the lower pair of slide fittings. As may be seen it comprises a tubular member 110 engaged on the frame member 46. The fitting 110 has a bore 112 which diverges outwardly towards both ends of the fitting as may be seen. In one side of the fitting 110 there is a bore 114 and a larger counterbore 116, numeral 118 designating a boss on the fitting 110 the bore 114 being centered in this boss. The fitting 110 is pivotally attached to the side part 22a of the seat 10 by way of a pivotal attaching member as designated at 120 this member having a nut at the inner end engaged in a counterbore 116. A similar slide fitting is, of course, provided at the other side of the chair engaged on the frame member 48 and pivotally attached to the side part 22 of the seat. These fittings can slide along the frame members 46 and 48 and the chair can also tilt with respect to these fittings as will be described in connection with FIG. 3.

FIG. 4 shows the two slide fittings to which the back part 14 of the seat 10 is attached to the back part of the frame. One of these slide fittings is shown in detail at 126 in FIGS. 5 and 6. As may be seen it engages the frame member 52 which occupies the channel formed by the side part 20a of the seat 10. The fitting 126 has a configuration as shown in FIG. 6 being flat at the back as shown at 128, having flat sides as shown at 130 and 132 and having a bore 134. The fitting is split axially at one side as shown at 136 the slot opening into the bore 134. On the side 130 there is formed a boss 138 and the fitting is pivotally attached to the side part 20a of the seat by way of pivotal fastener element 140. The bore 134 diverges outwardly towards its ends as may be seen in FIG. 5.

The fitting 126 has an intermediate arcuate slot 146 which is transverse and intersects the slot 136. The fitting 126 has a pair of axial bores 148 and 150 adjacent to the slot 136 the axis of these bores passing through the transverse slot 146. These bores receive pivot pins or shafts 152 and 154 and pivotally attached on these shafts are links 158 and 160 the end of link 158 being pivoted to an intermediate point of link 160 by way of a pivot pin 162. The end of the link 160 is connected to a rod or stem 164 having a hook 166 at its end.

The slide fitting 126a on the other side of the seat is like the fitting 126 and therefore, need not be described in detail, it having a similar pair of links including a longer link 160a.

The links 160 and 160a are interconnected by way of the rod or stem 164 and a tubular member 170 that telescopes into and which is connected by a similar hook member to the link 160a. Numeral 172 designates an adjusting handle pivotally attached to the stem 164. A group of extending abutments tabs are provided by way of cutouts in a side of the tubular member 170 as designated at 174 and engageable between these abutments or stops and the lever 172 is a thrust member 176. As may be observed, when the rod 164 and tubular member 170 are drawn towards each other they exert a force on the linkages to which they are connected tending to compress or draw together the fittings 126 and 126a so that they clamp onto the tubular members 52 and 53. This may readily be observed with respect to the fitting 126. As may be seen from FIGS. 4 and 6 when the rod 164 is drawn to the right the link 160 is drawn in a counterclockwise direction and a pull is then exerted on the link 158 tending to draw the side wings of the fitting 126 together tending to close the slot 136 and to compress the bore 134 so that the fitting clamps against the tubular member 52. The action is the same with respect to the fitting 126a. The clamping links are drawn towards each other when rod 164 is drawn into tubular member 170 by forcing the manual handle 172 inwardly. The clamping force or tension exerted by the fittings 126 and 126a is variably adjustable by adjusting the stop abutment 174 with which the thrust member 176 engages. When the handle 172 is pushed inwardly against the tubular member 170 it locks.

The fittings 126 and 126a are constructed so that they can clamp the tubular members 52 and 53 sufficiently tightly to normally hold the seat 10 in position on the frame during normal travel but to allow the seat 10 to translate relative to the frame 34 in the event of a collision or the like involving an impact producing a high rate of deceleration tending to cause the seat 10 to move forwardly. In this event both pairs of sliding fittings including the fitting 110 and the fittings 126 and 126a can translate, that is, slide relative to the tubular members that they engage. Thus the seat 10 translates forwardly relative to the frame 34 the lower pair of fittings sliding forwardly on the frame members 46 and 48 and in the upper pair of fittings 126 and 126a sliding downwardly along the frame members 52 and 53. As may be seen in FIG. 4 the frame member 52 has an enlargement in it as shown at 180, the frame member 53 having a similar enlargement spaced downwardly towards the seat support part of the frame to further retard translating movement of the fittings 126 and 126a to limit the amount of translating movement that the seat 10 can undergo. FIG. 3 shows the seat in forwardly translated position. As may be seen, as the seat translates forwardly it tilts, rotating relative to its pivotal suspension on both the lower fittings including the fitting 110 and the upper pair 126 and 126a. When the fittings 126 and 126a are unlocked or released they are able to slide over the enlargements such as shown at 180 to permit collapsing of the frame into the configuration as shown in FIG. 9.

From the foregoing those skilled in the art will readily understand the nature and construction of the invention, its manner of usage and the manner in which it achieves and realizes all of the objects and advantages as set forth in the foregoing. The seat frame is positioned on an automobile seat with the upper part of the frame hooked over the back of the seat as shown in FIG. 2. The clamping fittings 126 and 126a are set to a desired degree of tension or clamping force to the handle 172 in accordance with the weight of the child occupying the seat who is preferably held in by a seatbelt. The seatbelts of adjacent passengers can be passed through the frame part 56 as previously described. In the event of an impact such as a head-on collision the seat translates and tilts as previously described into a position as illustrated in FIG. 3, the force of the collision largely being dissipated with respect to the occupant of the seat by reason of its having been allowed to translate and tilt and to be appropriately retarded. Additional retarding mechanisms may be employed if desired or appropriate such as hydraulic or spring mechanisms. For example, a seatbelt on a bucket seat could be used to restrain or retard the frame.

The foregoing disclosure in representative of a preferred form of the invention and is to be interpreted in an illustrative rather than a limiting sense, the invention to be accorded the full scope of the claims appended hereto.

What is claimed is:

1. A safety seat adapted for use in a moving vehicle comprising a support frame, means for holding said frame on a vehicle seat, a seat comprising a seat portion and a back portion, means comprising spaced slidable connections pivotally mounted on said seat portion and said back portion and slidably embracing the frame whereby in the event of sudden deceleration of the frame the seat can translate and pivot a limited amount relative to the frame by sliding said connections therealong and while remaining connected thereto wherein said frame is made of tubular members, said tubular members having predetermined tapering enlargements in relationship to said slidable connections whereby to offer increasing resistance to the relative translating movement of the seat.

2. A seat structure as in claim 1 including manually operable latching means for locking the seat to the frame.

3. A seat structure as in claim 1 including guard members positioned to prevent an occupant's free from becoming engaged with the frame upon relative movement of the seat.

* * * * *